Feb. 24, 1942. O. E. FISHBURN 2,274,539
TRANSMISSION RAIL LOCK
Filed Jan. 18, 1940 3 Sheets-Sheet 1

INVENTOR
Otto E. Fishburn
BY Harness, Dickey, Pierce & Harris
ATTORNEYS.

Feb. 24, 1942.　　O. E. FISHBURN　　2,274,539
TRANSMISSION RAIL LOCK
Filed Jan. 18, 1940　　3 Sheets-Sheet 2

INVENTOR
Otto E. Fishburn.
BY Harness, Dind, Patee & Harris
ATTORNEYS.

Feb. 24, 1942.  O. E. FISHBURN  2,274,539

TRANSMISSION RAIL LOCK

Filed Jan. 18, 1940  3 Sheets-Sheet 3

INVENTOR
Otto E. Fishburn.
BY Harness, Dickey, Pierce & Harris
ATTORNEYS.

Patented Feb. 24, 1942

2,274,539

UNITED STATES PATENT OFFICE 2,274,539

TRANSMISSION RAIL LOCK

Otto E. Fishburn, Detroit, Mich., assignor to Chrysler Corporation, Highland Park, Mich., a corporation of Delaware Application January 18, 1940, Serial No. 314,531

1 Claim. (Cl. 74—477)

This invention relates to improvements in variable speed transmission mechanism.

More particularly, the invention pertains to improved gear shifting control apparatus for transmissions of this kind which is particularly adapted for use in motor vehicles.

The principal object of the invention is to provide in a variable speed transmission mechanism having shiftable members, a lock for at least one of said members which will retain the member in neutral position except when it is desired to shift the same.

An additional object is to provide a locking device of the character indicated which is automatic in operation and which will not interfere with normal operation of the transmission.

A still further object is to provide such a locking device which is easy and economical to manufacture and which will not require servicing after it is once assembled in the transmission casing.

Additional objects and advantages of the invention will be apparent from the following description.

In the drawings which illustrate a preferred embodiment of my invention,

Figures 1, 2:
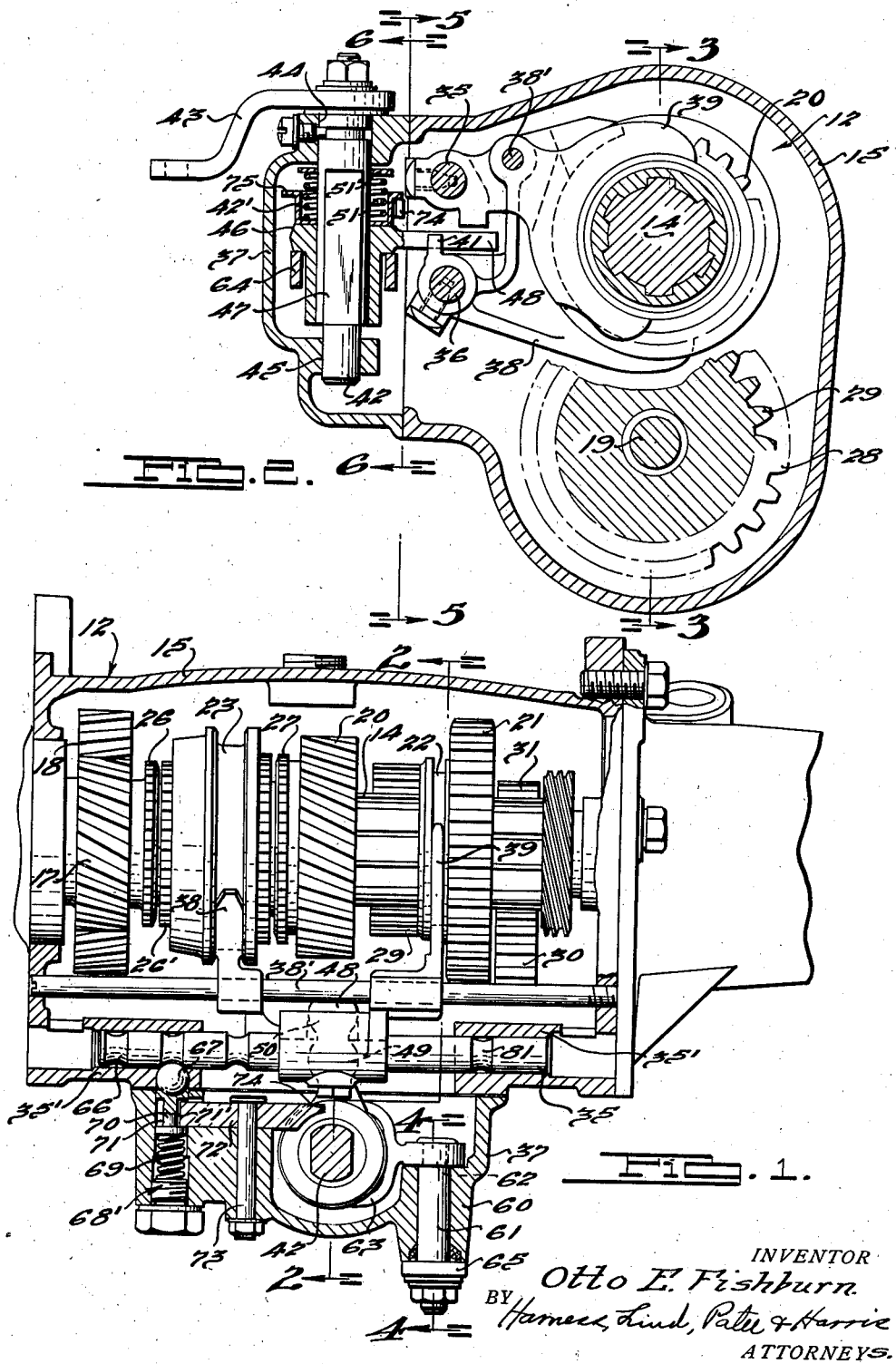
Fig. 1 is a plan view, partially in section, of a transmission embodying my invention.
Fig. 2 is a sectional view along line 2—2 of Fig. 1.

The drawings illustrate an embodiment of the invention which is intended to be used in a motor vehicle having the usual engine and clutch (not shown).

The transmission 12 includes a housing 15 into which extends a driving shaft 16 having a gear 17 meshed with a gear 18 fixed on a countershaft 19 which is journalled at its opposite ends in apertures in the end walls of the housing 15. The driven shaft 14 extends into the housing 15 and has a gear 20 journalled on its internal end portion. A slidable gear 21, disposed on the right side of the gear 20 and splined on the shaft 14, is provided with a shifter fork receiving collar 22. Formed on the adjacent sides of the gear 17 and 20 are hub portions which are provided with external clutch teeth 26 and 27 respectively.

Splined on the shaft 14 is a hub member having teeth 26'. A shiftable clutch member 23 is splined on the hub member at a location between the hub portion of the gears 17 and 20 and provided with internal clutch teeth with which the clutch teeth 27 and 26 respectively are adapted to be selectively meshed as is well known in the art. A direct drive setting of the gears may be produced by shifting the clutch member 23 to the left, as viewed in Figs. 1 and 4, to connect the clutch teeth 26 with the teeth 26'. When the clutch member 23 is shifted to the right the teeth 27 and 26' are connected thereby holding the gear 20 against rotation relative to the shaft 14. The gear 20 is permanently meshed with a gear 28 on the countershaft 19 by which the gear 20 and shaft 14 are driven to establish a second speed drive. Low speed and reverse settings of the transmission may be established by shifting the gear 21 into mesh with a gear 29 on the countershaft 19 and with a reverse gear 31 driven by a pinion 30 on the countershaft respectively.

A pair of shifter rails 35 and 36 extending longitudinally of the transmission at one side thereof are shiftably mounted in bosses 35' and 36' of the housing 15. A pair of laterally extending shifter forks 38 and 39 are slidably mounted on a rod 38' fixed in the housing at each end thereof, and respectively engage the grooves of the shift collars 23 and 22 as illustrated. A fork 38 is provided with a pair of spaced lugs 41 and 41ª between which is receivable a rail shifting or selector finger 48, which also has a part which is receivable into a notch 41' in the fork 39.

Figure 5:
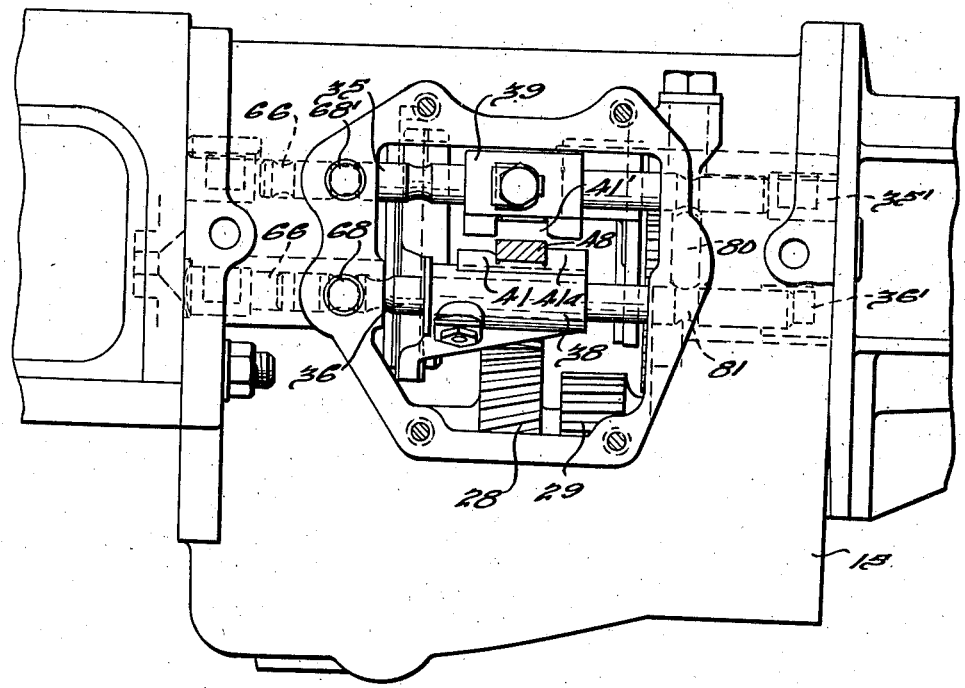
Fig. 5 is a sectional view taken approximately along line 5—5 of Fig. 2.

As is clearly shown in Fig. 5, the lug 41ª is of gerater height than the lug 41. This feature has an important bearing on the operation of the transmission and facilitates easy shifting thereof as will be more fully explained later on herein.

That portion of the control apparatus which is directly connected with the transmission mechanism housing is mounted on a cover 37 which is provided for closing the side opening of the transmission housing. The cover 37 includes a crowned central portion having opposite top and bottom wall portions extending longitudinally of the transmission in which are formed registering openings 44 and 45.

Figure 6:
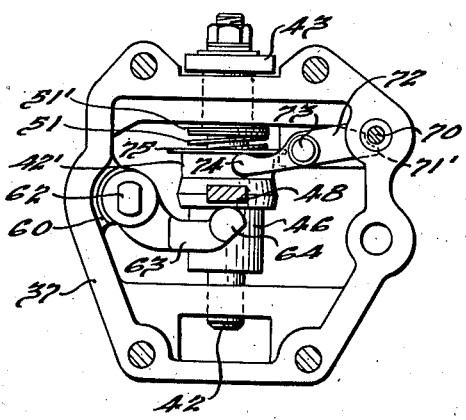
Fig. 6 is a sectional view along line 6—6 of Fig. 2.

A shaft 42 extending vertically of the cover 37 is journalled at its ends in the openings 44, 45. The shaft 42 has an external end portion protruding from the cover member 37 on which a lever 43 is non-rotatably fixed. A collar 46 is dispsoed within the cover and axially slidably mounted on the intermediate portion of the shaft 42 which is provided with flats 47 for holding the collar and shaft against relative rotation. The collar 46 carries the rail shifting finger 48, heretofore referred to, which is provided with an intermediate lobe portion 49 that registers with and is adapted to be received by the notch 41' of the rail 36, and a lobe portion 50 that registers with and is receivable between the lugs 41, 41ᵃ of the shifter fork 38. A coil spring 51 bears between a washer 51' which in turn bears against the upper rounded part of the shaft 42, and the bottom of a cup-shaped member 42' which rests on the enlarged portion of the collar 46 as shown in Figs. 2 and 6, for normally yieldably urging the collar 46 downwardly so as to retain the rail shifting finger 48 in operative engagement with the rail 36 and its shifter fork 38. The collar 46 may be moved upwardly, as viewed in Figs. 1 and 2, to bring the end lobe 50 between the lugs 41, 41ᵃ carried by the rail 35 and shifter fork 39.

Figure 4:
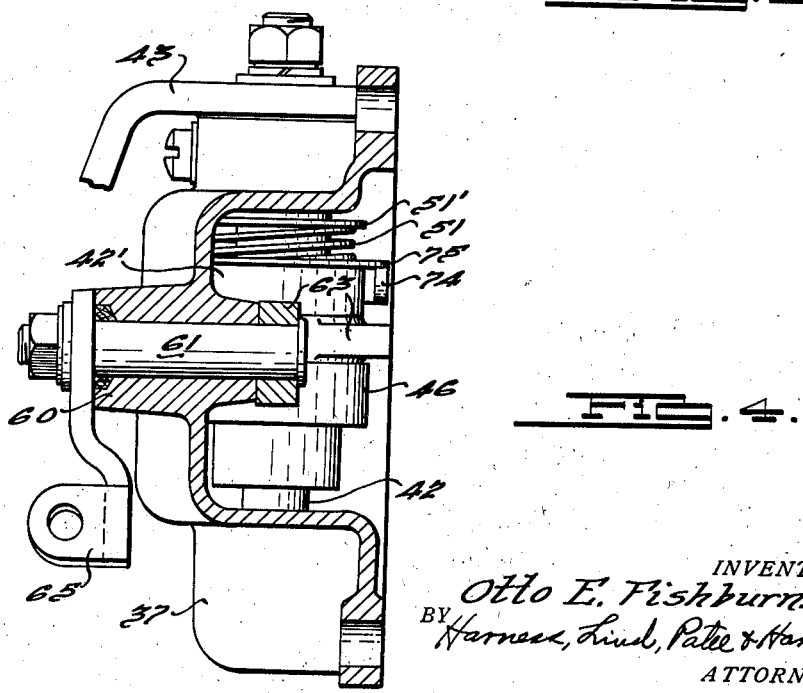
Fig. 4 is a sectional view along line 4—4 of Fig. 1.

The mechanism for moving the collar 46 upwardly against the pressure of the spring 51 is illustrated in Figs. 1, 4 and 6. The cover 37 has a transversely extending boss 60 in which is rotatably mounted a shaft 61 having a flattened inner end 62 on which is mounted a fork 63. The latter has a pair of rounded end portions 64 which engage the underside of the enlarged portion of the collar 46 at each side thereof. A lever 65 (Figs. 1 and 4) non-rotatably carried on the outer end of the shaft 61 is adapted to be actuated by any suitable means which is under the control of the vehicle driver.

The apparatus for actuating the selector lever 65 and the shift lever 43 is preferably of the type illustrated in the co-pending application of Frederic W. Slack, Serial No. 293,657, filed September 7, 1939, but any other suitable apparatus may be employed if desired.

From the mechanism so far described, it may be readily understood that rocking of the shaft 61 against the spring 51 by means of the lever 65 will move the collar 46 and finger 48 upwardly thereby disengaging the latter from engagement with lugs 41, 41ᵃ of rail 36 and engaging it with the notch 41' of rail 35.

Rocking of the shaft 42, with the finger 48 in its upper position, will slide the gear 21 forwardly into mesh with low speed drive gear 29 or rearwardly into mesh with reverse idler 31 as desired. When the finger 48 is in its lower position, rocking of the shaft 42 will slide clutch member 23 rearwardly to drivingly connect the teeth 26' with teeth 27 of second speed gear 20, or forwardly to drivingly connect the teeth 26' with teeth 26 of shaft 16 as desired.

The rails 35, 36 are respectively provided with slots 66 which are adapted to receive the respective balls 67 of a pair of detents generally designated 68, 68'. The detent 68 is provided with the usual spring (not shown) for urging its respective ball into engagement with the second direct rail 36, it being understood that the ball is adapted to recede slightly against the spring when the rail 36 is shifted and to engage the respective slots 66 therein for retaining the rail in its various shift positions as is common in the art.

The detent 68' which is operatively associated with the low-reverse rail 35 differs from the conventional detent 68 in that it is provided with a control which under certain conditions locks the rail 35 against movement. As may be seen in Fig. 1 taken together with Figs. 2 and 4–6, the detent 68' is provided with a plunger 70 having an inner rounded end which engages the detent ball 67 and an outer end which is engaged by the detent spring 69, and a reduced portion 71 which is adapted to be engaged by the outer rounded end 71' of a control lever 72. The lever 72 is pivotally mounted on the cover 37 by means of a bolt 73 and has an inner rounded end 74 which engages the underside of a flange 75 formed on the cup-shaped member 42' as illustrated.

The lever 72 is so mounted with relation to the other parts that, when the collar 46 is in its lower position, which is the position to which it is normally retained by the spring 51, the end 71' of said lever is engaged with the reduced portion 71 of the plunger 70 as shown in Figs. 1 and 6. With the parts in this position, movement of the rail 35 is impossible because the plunger 70 prevents the detent ball 67 from movement. The rail 35 is thus locked in neutral position and the rail 36 is free to be shifted by the finger 48.

When the selector lever 65 is operated to move the finger 48 out of engagement with the rail 36 (where it is normally positioned by the spring 51) and into engagement with the rail 35, as for instance, when shifting in low or reverse, upward movement of the collar 46 automatically unlocks the rail 35 because the upper surface of said collar contacts the rounded end 74 of lever 72 and rotates the lever about the bolt 73 thereby moving the end 71' of said lever out of engagement with the plunger 70. The rail 35 is thus freed for shifting, the plunger 70 moving inwardly against the spring 69 as the high portions of the rail 35 between the slots 66 contact ball 67.

An interlock pin 80 (Fig. 5) is also provided, this pin being adapted to engage either of the slots 81 provided in the shift rails according to which of the rails is shifted. The pin 80 may be eliminated if desired, but is preferably included for the purpose of locking the rail 36 in neutral during shifting of the rail 35.

In describing the operation of the device, let it be assumed that the vehicle in which the above described transmission mechanism is incorporated is provided with a suitable manually operated shift member which is oscillatable in a pair of transversely connected paths for shifting the transmission gears. With the transmission elements in neutral position as shown in the drawings, the selector or shift finger 48 will be urged by spring 51 into engagement with the lugs 41, 41ᵃ of high-second shift rail 36. Under such conditions the detent control arm 72 will be in the position shown in Fig. 6 with the rounded end 71' thereof in engagement with the reduced portion 71 of the detent control plunger 70 thereby locking the plunger and the ball 67 against movement which, in turn, locks the rail 35 against movement because of the engagement of the ball 67 with the centrally located recess 66 of said rail.

When shifting into low speed driving ratio, the driver, by suitable manipulation of the manually actuated shift lever (not shown) rotates selector lever 65 in a clockwise direction as shown in Fig. 1 which, through the intermediary of the fork 63, moves the collar 46 and selector finger 48 upwardly compressing the spring 51 and engaging the lobe 50 of said selector finger with the notch 41' of the low-reverse rail 35. As the collar 46 moves upwardly, it contacts the rounded end 74 of the detent control arm 72 swinging the same about the pivot 73 in a counterclockwise direction as viewed in Fig. 6 and moving the rounded end 71' out of engagement with the detent control plunger 70 thereby freeing said plunger for sliding movement in the bore of detent 68'. Movement of the shifter lever 43 to thereby rock shaft 42 counterclockwise as viewed in Fig. 1 will slide gear 21 to the left as viewed in Fig. 3 and into mesh with low speed countershaft gear 29.

Figure 3:
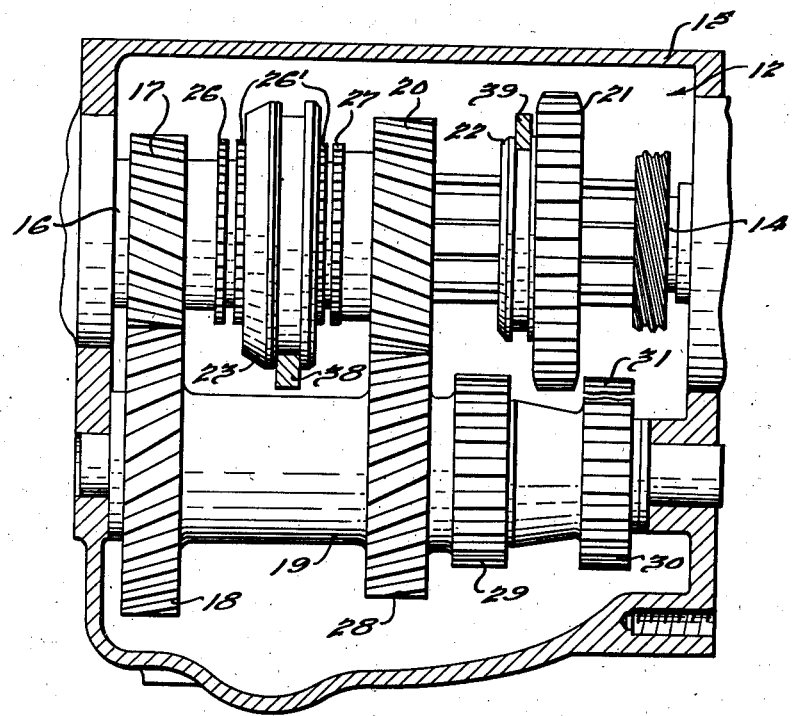
Fig. 3 is a sectional view along line 3—3 of Fig. 2.

When shifting from low speed into second or intermediate speed ratio, the lever 43 is manipulated to rotate shaft 42 in a clockwise direction as viewed in Fig. 1 to thereby slide gear 21 to the right as viewed in Fig. 3 and out of mesh with gear 29. As the finger 48 which is in engagement with the notch 41' is traversed from left to right as viewed in Fig. 5, the lower right hand edge of said finger will engage the lug 41a when the parts reach neutral position because of the fact that the lug 41 is shorter than the lug 41a and therefore the finger 48 is held in engagement with the notch 41' during the shift from low to neutral against the force of spring 51 by lug 41. At the instant of engagement of finger 48 with lug 41a, the spring 51 will snap the collar 46 and finger 48 downwardly into engagement with the rail 36 at the same time swinging arm 72 in a counterclockwise direction (as viewed in Fig. 6) to engage the end 71' thereof with the plunger 70 thereby locking rail 35. The finger 48 may then continue its travel toward the right hand side of Fig. 5 to thereby move rail 36 toward the right and engage clutch member 23 with the teeth 27 formed on gear 20. Second or intermediate speed ratio drive will then have been established.

It will be appreciated that the above described movements may be accomplished by the vehicle driver in an extremely short space of time by a single movement of the manually actuated shift lever in one of its paths of shifting movement, it not being necessary for the driver to hold the collar 46 in its upper position against the force of spring 51 due to the fact that the finger 48 will be retained in engagement with the notch 41' by the lug 41. Thus it may be seen that an automatic and practically instantaneous crossover is obtained at the instant that the rail 35 reaches neutral position at which instant the finger 48 drops out of engagement with rail 35 and picks up rail 36 for the shift into second speed ratio. This shift from low to second speed may be accomplished as rapidly as desired with perfect safety and with no clashing of gears due to overtravel of the rail 35 because rail 35 is locked in neutral position simultaneously with the crossover movement of finger 48 to pick up the rail 36.

If desired, the right hand side of the notch 41' may be chamfered slightly as shown in Fig. 5 to reduce the friction and give a quick release of the finger 48. It may thus be seen that I have provided what may be termed a "controlled detent" which in addition to serving the function of conventional detents known to the prior art also functions as a controlled lock for locking the low-reverse rail in neutral position during shifting of the second-high rail thereby permitting the advantages of the automatic cross-over to be fully realized without danger of damage to the transmission parts because of overtravel of the low-reverse rail.

Although but one embodiment of my invention is shown and described herein, I do not wish to thereby limit my invention in its broader aspects, the scope thereof being defined in the claim appended hereto and made a part hereof.

I claim:

In a change speed transmission mechanism having a housing and a pair of shift rails mounted in said housing for shifting longitudinally thereof, an opening in the side of said housing; a cover for said opening; a rockshaft mounted vertically in said cover and having a portion extending outwardly thereof for engagement by a shift lever; a selector element carried by said rockshaft and adapted for movement relatively thereto to selectively operably engage the rockshaft with said rails; detent means yieldably engaging said rails; a locking lever carried by said cover for rocking about an axis disposed perpendicular to the axis of said rockshaft; the ends of said locking lever being respectively disposed in engagement with said selector member and one of said detent means whereby shift of one of the rails is prevented while the selector member is in engagement with the other rail; and means for moving said selector member into engagement with said one rail including means for simultaneously rocking said locking lever to unlock said rail.

OTTO E. FISHBURN.